(12) United States Patent
Otero Martinez et al.

(10) Patent No.: US 9,272,489 B2
(45) Date of Patent: Mar. 1, 2016

(54) COMPOSITE PARTS COMPRISING PLASTICALLY DEFORMABLE RIGID POLYURETHANE FOAM, ADHESIVE AND COVERING MATERIAL

(71) Applicants: Iran Otero Martinez, Lemfoerde (DE); Alfonso Pacheco Gonzalez, Sabadell (ES); Ferran Antich Moros, Barcelona (ES)

(72) Inventors: Iran Otero Martinez, Lemfoerde (DE); Alfonso Pacheco Gonzalez, Sabadell (ES); Ferran Antich Moros, Barcelona (ES)

(73) Assignee: BASF SE, Ludwigshafen (DE)

( * ) Notice: Subject to any disclaimer, the term of this patent is extended or adjusted under 35 U.S.C. 154(b) by 140 days.

(21) Appl. No.: 13/686,216

(22) Filed: Nov. 27, 2012

(65) Prior Publication Data
US 2013/0136916 A1    May 30, 2013

Related U.S. Application Data

(60) Provisional application No. 61/563,861, filed on Nov. 28, 2011.

(51) Int. Cl.
*B32B 27/06* (2006.01)
*B32B 5/24* (2006.01)
*B32B 5/26* (2006.01)

(52) U.S. Cl.
CPC ............... *B32B 27/065* (2013.01); *B32B 5/245* (2013.01); *B32B 5/26* (2013.01); *B32B 2266/0278* (2013.01); *B32B 2605/00* (2013.01); *Y10T 428/249985* (2015.04)

(58) Field of Classification Search
CPC ...................................................... B32B 27/065
USPC ...................................... 156/331.7; 428/317.7
See application file for complete search history.

(56) References Cited

U.S. PATENT DOCUMENTS

2003/0134921 A1*  7/2003  Dexheimer .................... 521/108
2006/0079589 A1*  4/2006  Tadokoro et al. ............. 521/155

FOREIGN PATENT DOCUMENTS

| DE | 43 33 795 A1 | 4/1995 |
|---|---|---|
| DE | 10 2004 062 540 A1 | 7/2006 |
| EP | 0 437 787 A1 | 7/1991 |
| EP | 0 464 483 A1 | 1/1992 |
| WO | WO 2010/139708 A1 | 12/2010 |
| WO | WO 2010139708 A1 * | 12/2010 |

* cited by examiner

*Primary Examiner* — Daniel Lee
(74) *Attorney, Agent, or Firm* — Oblon, McClelland, Maier & Neustadt, L.L.P

(57) ABSTRACT

The present invention relates to a process for producing composite parts comprising a thermoformable rigid polyurethane foam and a covering material, wherein a thermoformable polyurethane foam is provided and adhesively bonded to covering material, where a moisture-curing polyurethane adhesive which is cured by bringing into contact with an alkaline, aqueous alkali metal solution is used as adhesive. The present invention further relates to a composite part which can be obtained by such a process and to the use of such a composite part in vehicles.

13 Claims, No Drawings

COMPOSITE PARTS COMPRISING PLASTICALLY DEFORMABLE RIGID POLYURETHANE FOAM, ADHESIVE AND COVERING MATERIAL

The present invention relates to a process for producing composite parts comprising a thermoformable rigid polyurethane foam and a covering material, wherein a thermoformable polyurethane foam is provided and adhesively bonded to covering material, where a moisture-curing polyurethane adhesive which is cured by bringing into contact with an alkaline, aqueous alkali metal solution is used as adhesive. The present invention further relates to a composite part which can be obtained by such a process and the use of such a composite part in vehicles.

Plastically deformable rigid polyurethane foams, hereinafter also referred to as thermoformable rigid polyurethane foams, and their use as interior cladding in motor vehicles is known and is described, for example, in "Kunststoffhandbuch, volume 7, Polyurethane", Carl Hanser Verlag, $3^{rd}$ edition, 1993, chapter 6.5.4.1. In the production of the interior cladding, the plastically deformable rigid polyurethane foam is plastically deformed in a mold and laminated with covering materials either during the shaping step or after shaping is complete. Covering materials which can be used are, for example, reinforcing materials such as fiberglass mats and/or decorative materials, for example nonwovens. These covering materials are adhesively bonded onto the rigid polyurethane foam by means of an adhesive, generally based on polyurethane, either during or after plastic deformation. It is particularly advantageous for lamination with covering materials to be able to be carried out in one step together with plastic deforming. Such plastically deformable rigid polyurethane foams and lamination of these thermoformable rigid polyurethane foams with covering materials is, for example, described in EP 437787 and DE 4333795.

The polyurethane-based adhesives which are preferably used are, in particular, moisture-curing one-component adhesives. In this case, the adhesives are applied to the as yet not pressed rigid foam, sprayed with water, laminated with the covering materials and pressed in a mold at elevated temperature.

As moisture-curing one-component adhesives, preference is given to using isocyanate-terminated polyurethane prepolymers which are provided with catalysts. Such moisture-curing one-component adhesives comprising tin-based catalysts or tertiary amines as catalysts are described, for example, in EP 464483. A disadvantage of such adhesives is that they have only limited storage stability and frequently have only a short processing time. Furthermore, tin-organic compounds are problematical from a toxicological point of view.

WO 2010/139708 describes a process for adhesively bonding a plastically deformable rigid polyurethane foam to a covering material, in which the moisture-curing polyurethane adhesive is cured by addition of an aqueous alkali metal silicate solution. Although in this process the use of catalysts in the polyurethane adhesive can be dispensed with, as a result of which the processing time of the adhesive can be lengthened significantly, water glass has to be used in high concentrations. Alkali metal silicate solutions react with even small amounts of carbon dioxide in the surrounding air, which leads to difficult-to-remove silicate deposits on the apparatuses used. Furthermore, the mechanics of the composite bodies obtained are in need of improvement.

It was therefore an object of the present invention to provide a process for adhesively bonding a plastically deformable rigid polyurethane foam to a covering material, in which the use of catalysts in the polyurethane adhesive can be dispensed with and the problem of difficult-to-remove deposits on the apparatuses used is avoided. A further object of the present invention was to provide a composite part which comprises thermoformable polyurethane foam and covering material and has excellent mechanical properties.

The object of the invention was achieved by a process for producing composite parts comprising a thermoformable rigid polyurethane foam and a covering material, wherein a thermoformable polyurethane foam is provided and adhesively bonded to covering material, where a moisture-curing polyurethane adhesive which is cured by bringing into contact with an alkaline, aqueous alkali metal solution is used as adhesive. Furthermore, a composite part which can be obtained by such a process and comprises a thermoformable rigid polyurethane foam and a covering material achieves the object of the invention.

As covering materials, preference is given to using conventional materials used for covering thermoformable rigid polyurethane foams. These comprise fiberglass mats, flexible foam layers, fabrics such as woven fabrics, knitteds and nonwovens and also combinations of the conventional covering materials.

As thermoformable rigid polyurethane foam, it is possible to use any conventional thermoformable rigid polyurethane foam. Such rigid polyurethane foams are described, for example, in EP 437787, DE 4333795 and DE102004062540. These are preferably open-pored and preferably do not emit any substances which lead to odors. In a preferred embodiment, a thermoformable rigid polyurethane foam of the type in question for the invention is obtained by mixing a) organic polyisocyanates with b) polyetherols comprising b1) 2- to 4-functional polyoxyalkylene polyol having a hydroxyl number of from 150 to 650 and a proportion of primary hydroxyl groups of greater than 70% and b2) difunctional to trifunctional polyoxyalkylene polyol having a hydroxyl number of from 25 to 40 and a proportion of primary hydroxyl groups of greater than 70%, optionally c) chain extenders and/or crosslinkers, d) blowing agents, e) catalysts and optionally f) auxiliaries and additives to form a reaction mixture and allowing this reaction mixture to react to completion.

Thermoformable rigid polyurethane foams according to the invention can be plastically deformed, preferably at tool temperatures of from 80 to 160° C., particularly preferably from 100 to 150° C. Here, customary starting materials known in polyurethane chemistry are used as starting materials a) to f). The polyoxyalkylene polyol b1) preferably comprises at least 30% by weight, particularly preferably at least 50% by weight, of ethylene oxide. The polyoxyalkylene polyol b2) preferably comprises at least 50% by weight, particularly preferably at least 80% by weight, of propylene oxide.

Apart from the abovementioned polyoxyalkylene polyols b1) and b2), it is also possible to use further polyhydroxy compounds such as further polyetherols, polyesterols or other compounds which are reactive toward isocyanate, e.g. polythiols or polyamines. The proportion by weight of the compounds b1) and b2) based on the total weight of the component b) is preferably at least 50% by weight, particularly preferably at least 70% by weight and in particular at least 80% by weight. The ratio of polyoxyalkylene polyols b1) and b2) is preferably from 0.8:1 to 1.5:1.

As chain extenders and/or crosslinkers c) for producing the thermoformable rigid polyurethane foam, preference is given to using dipropylene glycol and/or tripropylene glycol.

For the purposes of the invention, a moisture-curing polyurethane adhesive is a mixture comprising a prepolymer having isocyanate groups or the prepolymer having isocyanate groups itself, where the mixture comprises at least 50% by weight, preferably at least 80% by weight and in particular at least 95% by weight, of a prepolymer having isocyanate groups. Furthermore, a moisture-curing polyurethane adhesive according to the invention can comprise further additives such as surface-active substances, inhibitors such as diglycol bischloroformate or orthophosphoric acid, plasticizers, inorganic fillers such as sand, kaolin, chalk, barium sulfate, silicon dioxide, oxidation stabilizers, dyes and pigments, stabilizers, e.g. against hydrolysis, light, heat or discoloration, inorganic and/or organic fillers, emulsifiers, flame retardants, aging inhibitors, bonding agents and reinforcing materials and also catalysts customary in polyurethane chemistry. The viscosity of the moisture-curing polyurethane adhesive according to the invention is preferably in the range from 500 to 5000 mPas, particularly preferably from 1000 to 3000 mPas, measured at 25° C. in accordance with DIN 53018.

For the purposes of the invention, a prepolymer comprising isocyanate groups is the reaction product of polyisocyanates with polymeric compounds which have at least two groups which are reactive toward isocyanates, optionally compounds having one group which is reactive toward isocyanates and optionally chain extenders and/or crosslinkers, with the polyisocyanate being used in excess.

As polyisocyanates for the preparation of the prepolymer comprising isocyanate groups, it is possible to use all aliphatic, cycloaliphatic and aromatic bifunctional or polyfunctional isocyanates known from the prior art and also any mixtures thereof. Preference is given to using aromatic bifunctional or polyfunctional isocyanates. Examples are diphenylmethane 4,4'-, 2,4'- and 2,2'-diisocyanate, mixtures of monomeric diphenylmethane diisocyanates and homologues of diphenylmethane diisocyanate having more than two rings (polymeric MDI), tetramethylene diisocyanate, hexamethylene diisocyanate (HDI), isophorone diisocyanate (IPDI), naphthalene 1,5-diisocyanate (NDI), toluene 2,4,6-triisocyanate and tolylene 2,4- and 2,6-diisocyanate (TDI) or mixtures thereof.

Particular preference is given to using tolylene 2,4-diisocyanate, tolylene 2,6-diisocyanate, diphenylmethane 2,4'-diisocyanate and diphenylmethane 4,4'-diisocyanate and homologues of diphenylmethane diisocyanate having more than two rings (polymeric MDI) and mixtures of these isocyanates, uretonimine, in particular a mixture of diphenylmethane 2,4'-diisocyanate and diphenylmethane 4,4'-diisocyanate, as polyisocyanate (a).

As polymeric compounds which are reactive toward isocyanates and have at least two groups which are reactive toward isocyanates for the preparation of the prepolymer comprising isocyanate groups, it is possible to use all compounds having at least two groups which are reactive toward isocyanate groups. These have a molecular weight of at least 400 g/mol. Preference is given to using polyesterols, polyetherols or polyether-polyesterols which can be obtained, for example, by alkoxylation of polyesters.

Polyetherols are prepared by known methods, for example from one or more alkylene oxides having from 2 to 4 carbon atoms in the alkylene radical by anionic polymerization using alkali metal hydroxides or alkali metal alkoxides as catalysts with addition of at least one starter molecule comprising from 2 to 5, preferably from 2 to 4 and particularly preferably from 2 to 3, in particular 2, reactive hydrogen atoms in bound form or by cationic polymerization using Lewis acids such as antimony pentachloride or boride trifluoride etherate. Furthermore, it is also possible to use multimetal cyanide compounds, known as DMC catalysts, as catalysts. Suitable alkylene oxides are, for example, tetrahydrofuran, 1,3-propylene oxide, 1,2- or 2,3-butylene oxide and preferably ethylene oxide and 1,2-propylene oxide. The alkylene oxides can be used individually, alternately in succession or as mixtures. Preference is given to using 1,2-propylene oxide, ethylene oxide or mixtures of 1,2-propylene oxide and ethylene oxide.

As starter molecule, preference is given to water or 2- and 3-hydric alcohols such as ethylene glycol, 1,2- or 1,3-propanediol, diethylene glycol, dipropylene glycol, 1,4-butanediol, glycerol and trimethylolpropane.

The preferred polyether polyols, particularly preferably polyoxypropylene or polyoxypropylene-polyoxyethylene polyols, have a functionality of from 2 to 5, particularly preferably from 2 to 3, and molecular weights of from 400 to 9000 g/mol, preferably from 1000 to 6000 g/mol, particularly preferably from 1500 to 5000 g/mol and in particular from 2000 to 4000 g/mol. Particular preference is given to using polypropylene glycol having a weight average molecular weight of from 1500 to 2500 g/mol as polyether polyol.

In addition to the polymeric compounds having at least two groups which are reactive toward isocyanate groups, it is also possible to use compounds having only one group which is reactive toward isocyanates. These are preferably polyether monools which are obtained from monofunctional starter molecules, for example ethylene glycol monomethyl ether, in a manner analogous to the preparation of the above-described polyetherols. The molecular weight of the polyether monools is preferably from 100 to 1000 g/mol. When polyether monools are used, the weight ratio of polyether monool to polyether polyol is preferably from 1:30 to 4:1.

Chain extenders and/or crosslinkers can optionally also be used for preparing the prepolymer comprising isocyanate groups. The addition of the chain extenders and/or crosslinkers can be carried out before, together with or after the addition of the polyols. As chain extenders and/or crosslinkers, use is made of substances having a molecular weight of preferably less than 400 g/mol, particularly preferably from 60 to 350 g/mol, with chain extenders having 2 hydrogen atoms which are reactive toward isocyanates and crosslinkers having 3 hydrogen atoms which are reactive toward isocyanate. These can be used individually or in the form of mixtures. If chain extenders are used, particular preference is given to 1,3- and 1,2-propanediol, dipropylene glycol, tripropylene glycol, 1,3-butanediol.

If chain extenders, crosslinkers or mixtures thereof are employed, they are advantageously used in amounts of from 1 to 60% by weight, preferably from 1.5 to 50% by weight and in particular from 2 to 40% by weight, based on the weight of polyisocyanates, polymeric compounds which are reactive toward isocyanate and chain extenders and/or crosslinkers.

The isocyanate prepolymers can be obtained by reacting an excess of polyisocyanates as described above, for example at temperatures of from 30 to 100° C., preferably at about 80° C., with the polymeric compounds having at least two groups which are reactive toward isocyanates, optionally compounds having one group which is reactive toward isocyanates and optionally chain extenders and/or crosslinkers to form the prepolymer. Here, polyisocyanate, polymeric compounds having at least two groups which are reactive toward isocyanates, optionally compounds having one group which is reactive toward isocyanates and optionally chain extenders and/or crosslinkers are preferably mixed with one another in a ratio of isocyanate groups to groups which are reactive toward isocyanates of from 1.5:1 to 15:1, preferably from 1.8:1 to 8:1. The prepolymers are particularly preferably prepared by mixing polyisocyanates, polymeric compounds having at least two groups which are reactive toward isocyanates, optionally compounds having one group which is reactive toward isocyanates and optionally chain extenders and/or crosslinkers with one another in such a ratio that the NCO content of the prepolymer produced is in the range from 5 to 30% by weight, in particular from 10 to 25% by weight, based on the total weight of the isocyanate prepolymer produced. Volatile isocyanates can then preferably be separated off, preferably by thin film distillation. Here, the viscosity of the isocyanate prepolymers is preferably from 100 to 5000 mPas at 25° C. Isocyanate prepolymers according to the invention based on tolylene diisocyanate typically have a viscosity of from 500 to 3000 mPas, while isocyanate prepolymers according to the invention based on diphenylmethane diisocyanate typically have a viscosity of from 600 to 3000 mPas, in each case at 25° C. The average isocyanate functionality of the isocyanate prepolymers is preferably from 2.0 to 2.9, particularly preferably from 2.1 to 2.6.

The moisture-curing polyurethane adhesive can also comprise catalysts. These comprise, for example, amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutane-diamine, N,N,N',N'-tetramethylhexanediamine, pentamethyldiethylenetriamine, bis(dimethylaminoethyl)ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds such as triethanolamine, triisopropanolamine, N-methyldiethanolamine and N-ethyldiethanolamine and dimethylethanolamine. Organic metal compounds, preferably organic tin compounds such as tin(II) salts of organic carboxylic acids, e.g. tin(II) acetate, tin(II) octoate, tin(II) ethylhexanoate and tin(II) laurate, and the dialkyltin (IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate or mixtures thereof are likewise possible as catalysts. The organic metal compounds can be used either alone or in combination with basic amines.

Preference is given to adding less than 2% by weight, particularly preferably less than 1% by weight, of catalyst or catalyst combination and in particular no catalyst or catalyst combination, based on the weight of the prepolymer having isocyanate groups.

In the production of the composite part of the invention, preference is given to using from 2 to 300 g, particularly preferably from 50 to 200 g, of moisture-curing polyurethane adhesive per m² of the thermoformable rigid polyurethane foam.

The curing of the moisture-curing polyurethane adhesive is effected by bringing into contact with an alkaline, aqueous alkali metal solution. This preferably comprises essentially no silicates. Here, the term silicates comprises all soluble silicon-oxygen compounds, in particular all compounds derived from $SiO_4^{4-}$ and condensates thereof. Here, "essentially" means that the aqueous alkali metal solution comprises soluble silicates in only such amounts that do not lead to precipitates. The solution preferably comprises less than 10% by weight, particularly preferably less than 1% by weight and in particular less than 0.1% by weight, of soluble silicates. Very particular preference is given to no compound comprising soluble silicates, for example water glass, being added to the alkaline, aqueous alkali metal solution. Soluble silicates which can, for example, get into solution by unintended dissolution from glasses, for example conventional glass vessels, are not intended to be ruled out here.

The alkaline, aqueous alkali metal solution preferably has an alkali metal concentration of from 0.1 to 10 mol and a pH of at least 10, preferably at least 11, particularly preferably at least 12, more preferably at least 13 and in particular at least 13.5. The maximum pH is not subject to any restrictions. For process-engineering reasons, the $OH^-$ concentration is preferably not more than 10 mol/l, particularly preferably not more than 5 mol/l, more preferably not more than 3 mol/l and in particular not more than 2 mol/l. In particular, the alkali metal ions in the solution are lithium, sodium or potassium ions, or mixtures comprising at least two from among lithium, sodium and potassium ions, preferably mixtures comprising sodium and potassium ions. The alkaline, aqueous alkali metal solution can be obtained, for example, by dissolving alkali metal compounds with weak acids and/or alkali metal hydroxides and also by direct reaction of alkali metal with water. For the present purposes, weak acids are compounds having a pKa for the deprotonation of the last hydrogen atom of at least 8, preferably at least 9 and in particular at least 10. Examples of possible alkali metal compounds with a weak acid are alkali metal salts of isocyanic acid, alkali metal sulfides, alkali metal phosphates and alkali metal carbonates, preferably alkali metal carbonates. In particular, alkali metal hydroxides and/or alkali metal carbonates are used.

The weight ratio of alkaline, aqueous alkali metal solution to moisture-curing polyurethane adhesive is typically in the range from 2:1 to 1:10, preferably from 1:1 to 1:5. This corresponds to an application of from 1 to 150 g per m² of thermoformable rigid polyurethane foam.

In the production of the composite parts of the invention, the thermoformable rigid polyurethane foam is usually provided first. The moisture-curing polyurethane adhesive is then applied to this on one side or preferably both sides and sprayed with the alkali metal silicate solution. The covering material is subsequently applied and the composite body is shaped in a mold at elevated temperature, preferably from 60 to 180° C., particularly preferably from 100 to 150° C., and the moisture-curing polyurethane adhesive is cured. When the preferred mass ratios are adhered to, foaming of the moisture-curing polyurethane adhesive by means of which the open-celled nature of the thermoformable rigid polyurethane foam is not impaired is achieved in this processing.

The invention also provides a composite part which can be obtained by a process according to the invention.

The composite part of the invention is preferably used as cladding part in land, water and air vehicles, in particular as cladding part in automobiles, in particular as interior roof.

The process of the invention can be carried out on existing production plants. The moisture-curing polyurethane prepolymers used as adhesive are stable for a long time and can also be processed at room temperature or slightly elevated temperature for a long time since no or only comparatively little catalyst is comprised in the moisture-curing polyurethane adhesive.

It has surprisingly been found that the process of the invention also leads to advantageous stiffening of the thermoformed rigid polyurethane foam. Furthermore, a process according to the invention leads to a faster demolding time and thus to a more economical utilization of the production plants.

The invention is illustrated below with the aid of examples.

Starting Materials

Polyol 1: propylene glycol-initiated polyether polyol (OHN 30 mg KOH/g) having predominantly primary OH groups (composition 80% of propylene oxide, 20% of ethylene oxide)

Polyol 2: methylpolyethylene glycol (OHN 113 mg KOH/g)

Isocyanate: polymeric diisocyanatodiphenylmethane (PMDI)

Catalyst 1: organotin ester

Catalyst 2: aqueous solution of sodium silicate $M_2O:SiO_2$ ratio: $SiO_2:Na_2O$ 3.3:1 (16% solids content)

Production of the Foam from the Polyurethane Adhesive (Comparison 1):

20.0 parts by weight of the polyurethane adhesive and 1.2 parts of water were mixed with one another and the reaction mixture was allowed to react to form the polyurethane foam. This gave an open- and coarse-celled foam.

The reactivity of the reaction mixtures for producing the polyurethane foams as per example and comparison and also the viscosity and viscosity increase of the polyurethane adhesives as per example and comparison after stirring at 55° C. for 2 hours over a water bath are shown in table 1:

TABLE 1

|  | C1 | C2 | E1 | E2 | E3 | E4 |
|---|---|---|---|---|---|---|
| Cream time (s) | 34 | 39 | 28 | 30 | 30 | 29 |
| Fiber time (s) | 168 | 110 | 80 | 90 | 100 | 85 |
| Rise time (s) | 300 | 200 | 155 | 200 | 240 | 175 |
| Cell structure | coarse, open | coarse, open | coarse, open | coarse, open | coarse, open | coarse, open |
| Viscosity of the polyurethane adhesive [mPas at 45° C.] | 775 |  |  | 364 |  |  |
| Viscosity (45° C.) of the polyurethane adhesive (reaction mixture?) after stirring at 55° C. for 2 hours over a water bath [mPas at 45° C.] | 1245 |  |  | 432 |  |  |

Catalyst 3: aqueous sodium carbonate solution (0.5 mol/l)
Catalyst 4: aqueous sodium hydroxide solution (0.5 mol/l)
Catalyst 5: aqueous potassium carbonate solution (0.2 mol/l)
Catalyst 6: aqueous potassium hydroxide solution (0.5 mol/l)
Inhibitor 1: diglycol bischloroformate (DIBIS)
Inhibitor 2: orthophosphoric acid 85%

EXAMPLE

Production of the Polyurethane Adhesive

Comparative Example 2, Examples 1 to 4

70 parts by weight of a PMDI and 0.01 part by weight of inhibitor 1 were placed in a stirred vessel and heated to 80° C. while stirring. 29.6 parts by weight of a mixture of polyol 1 and polyol 2 (weight ratio 1:2) were slowly added thereto. After the addition was complete, the mixture was stirred for another 120 minutes, cooled to 25° C. and packaged. The NCO content and the viscosity of the polyurethane prepolymer obtained were 21% and 500 mPas, respectively. 0.02 part by weight of inhibitor 1 and 0.03 part by weight of inhibitor 2 were subsequently added.

Production of the Foam from the Polyurethane Adhesive

Comparative Example 2, Examples 1 to 4

20.0 parts by weight of the polyurethane adhesive and 1.2 parts by weight of catalyst 2, 3, 4, 5 or 6 were mixed with one another and the reaction mixture was allowed to react to form the polyurethane foam. This gave an open- and coarse-celled foam. Cream, fiber and rise times are shown in table 1.

Comparison 1:

Production of the Polyurethane Adhesive:

The procedure of examples 1 to 4 was repeated, with 0.06 part of catalyst 1 being additionally added.

The table shows that the foam as per examples 1 to 4 displays not only the desired open and coarse cell structure but also a faster reaction rate. A faster cycle time is achieved as a result of the shorter fiber and rise time. Furthermore, a polyurethane adhesive according to the invention displays a significantly improved stability under the conditions before application, known as the roller stability, which has been simulated by stirring at 55° C. for 2 hours over a water bath, since this, like the adhesive of comparative example 2, does not comprise any catalyst.

An interior roof is produced by means of the moisture-curing polyurethane adhesive using the catalysis according to the invention (examples 1 and 2) and the catalysis according to comparative examples 1 and 2. The following layer sequence was used:

1. Nonwoven 190 g/m² from Fytisa (1.1 mm)
2. Fiberglass mat 100+/−10 g/m² Owens Corning Vetrotex
3. Water 25 g/m²
4. Adhesive 100 g/m²
5. Foam RG20 Elastoflex E 3943/112 10.6 mm (22 kg/m³)
6. Adhesive 100 g/m²
7. Water 25 g/m²
8. Fiberglass mat 100+/−10 g/m² Owens Corning Vetrotex
9. Nonwoven PET with LDPE in the side which is not visible (45 g/m² of PET fibers+15 g/m² of LDPE), from Fytisa (0.25 mm)

The material was pressed to a thickness of 11 mm in a mold at 130° C. for 25 seconds and the flexural strength of the interior roof produced was determined by a method based on DIN 53423. Here, the width of the test specimen was 50 mm and the thickness was 11 mm. The testing speed was 50 mm/minute. All test specimens achieved the maximum force at a deflection of about 5 mm. The test specimens subsequently did not break but the maximum force decreased again at a greater deflection. The values for the maximum force, the E modulus, the force at 20 mm deflection, the maximum force and the stiffness, which is given by the initial gradient of the force-deflection curve in the linear region, are shown in the following table. Here, the values are the average of three individual measurements. The E modulus is calculated according to the following formula:

$$E(\text{modulus in MPa}) = \frac{\text{force (N)} \cdot (\text{length (mm)})^3}{4 \cdot \text{deflection(mm)} \cdot \text{width(mm)} \cdot \text{thickness(mm)})^3}$$

$$= \text{stiffness(N/mm)} \frac{(\text{length (mm)})^3}{4 \cdot \text{width(mm)} \cdot \text{thickness(mm)})^3}$$

TABLE 2

|  | C1 | C2 | E1 | E2 |
|---|---|---|---|---|
| Maximum force (N) | 13.46 | 17.79 | 24.68 | 24.40 |
| Force at 20 mm deflection (N) | 8.56 | 10.71 | 15.40 | 18.06 |
| Stiffness (N/mm) | 6.34 | 9.18 | 9.80 | 10.84 |
| E modulus (MPa) | 24.30 | 34.16 | 38.78 | 41.99 |

The interior roofs according to the examples have a significantly higher E modulus and stiffness than the interior roofs according to the comparative experiments.

The invention claimed is:

1. A process for producing a composite part comprising a thermoformable rigid polyurethane foam and a covering material, the process comprising:
   adhesively bonding the thermoformable polyurethane foam to the covering material with an adhesive, thereby forming the composite part,
   wherein the adhesive is a moisture-curing polyurethane adhesive which is cured by bringing into contact with an alkaline, aqueous alkali metal solution during said adhesive bonding, and
   wherein the alkaline, aqueous alkali metal solution comprises essentially no silicate.

2. The process according to claim 1, wherein a concentration of the alkaline, aqueous alkali metal solution is from 0.1 to 10 molar, based on the alkali metal.

3. The process according to claim 1, wherein a pH of the aqueous, alkaline alkali metal solution is at least 10.

4. The process according to claim 1, wherein the alkali metal is sodium or potassium or a mixture of sodium and potassium.

5. The process according to claim 1, wherein the alkaline, aqueous alkali metal solution is applied in an amount of from 10 to 150 g/m² of the thermoformable rigid polyurethane foam.

6. The process according to claim 1, wherein the moisture-curing polyurethane adhesive comprises:
   at least 80% by weight of an isocyanate-terminated prepolymer, based on the total weight of the moisture-curing polyurethane adhesive; wherein the isocyanate-terminated prepolymer is obtained by mixing a stoichiometric excess of aromatic isocyanate with at least one polymeric compound having at least two groups which are reactive toward an isocyanate and optionally at least one compound having only one group which is reactive toward an isocyanate and optionally at least one chain extender and/or at least one crosslinker.

7. The process according to claim 6, wherein an NCO content of the isocyanate-terminated prepolymer is from 5 to 30% by weight.

8. The process according to claim 1, wherein no further catalysts apart from the alkaline, aqueous alkali metal solution are present during curing of the adhesive.

9. The process according claim 1, wherein the adhesive is present in an amount of from 20 to 300 g/m² of the thermoformable rigid polyurethane foam.

10. The process according to claim 1, wherein the thermoformable polyurethane foam, the covering material and the moisture-curing polyurethane adhesive are adhesively bonded in a mold having a mold temperature of from 60 to 180° C.

11. The process according to claim 1, wherein the thermoformable polyurethane foam is an open-pore foam.

12. The process according to claim 1, wherein the thermoformable polyurethane foam is a reaction product of a material composition comprising:
   a) an organic polyisocyanate;
   b) polyetherols comprising b1) 2- to 4-functional polyoxyalkylene polyol having a hydroxyl number of from 150 to 650 and a proportion of primary hydroxyl groups of greater than 70% and b2) difunctional to trifunctional polyoxyalkylene polyol having a hydroxyl number of from 25 to 40 and a proportion of primary hydroxyl groups of greater than 70%;
   c) optionally, a chain extender and/or crosslinker;
   d) a blowing agent;
   e) a catalyst; and
   f) optionally, an auxiliary and/or additives.

13. The process according to claim 1, wherein a viscosity of the moisture-curing polyurethane adhesive is from 500 to 5000 mPas, measured at 25° C. in accordance with DIN 53018.

* * * * *